UNITED STATES PATENT OFFICE.

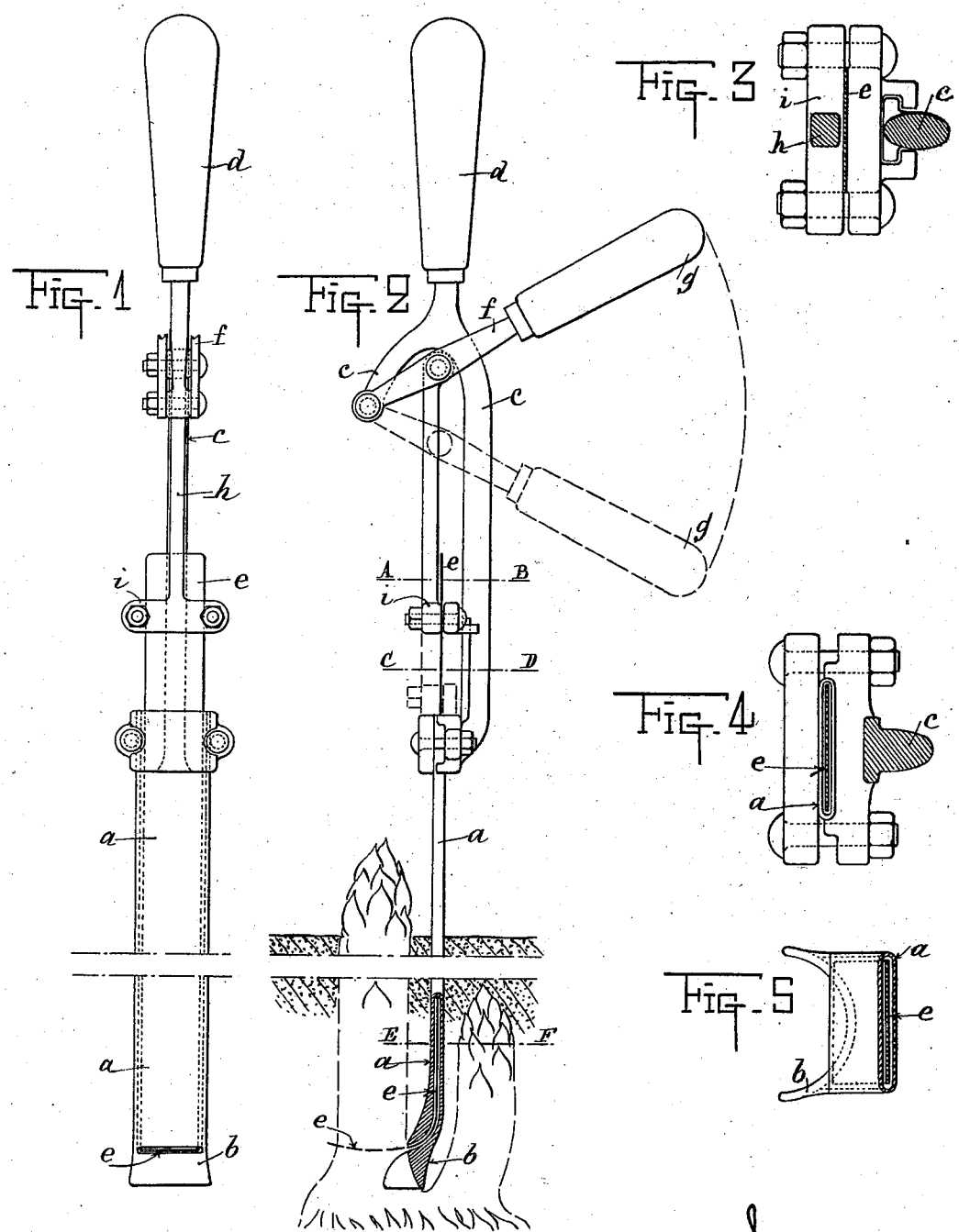

ALEXANDRE PERDRIEL, OF NANTES, FRANCE.

KNIFE FOR CUTTING ASPARAGUS OR THE LIKE.

SPECIFICATION forming part of Letters Patent No. 692,542, dated February 4, 1902.

Application filed September 20, 1901. Serial No. 75,700. (No model.)

*To all whom it may concern:*

Be it known that I, ALEXANDRE PERDRIEL, a citizen of the Republic of France, residing at Nantes, France, have invented certain new and useful Improvements in Knives for Cutting Asparagus, of which the following is a specification.

The knife which forms the object of the present invention is intended to facilitate the delicate operation of cutting asparagus without fear of crushing the stalks and without endangering the hand.

In order to allow the construction and working of the implement to be better understood, I have shown one form of construction as an example in the accompanying drawings, in which—

Figure 1 is a front view of the asparagus-knife; Fig. 2, a side view of same; Fig. 3, a horizontal section on the line A B of Fig. 2; Fig. 4, a horizontal section on the line C D of Fig. 2; Fig. 5, a horizontal section on the line E F of Fig. 2.

This instrument is composed of two principal working parts—viz., first, a rigid sheath *a*, carrying at its lower end a gouge *b*, which has well-rounded edges, as it is not intended for cutting purposes, at the upper part of which sheath a framework *c*, surmounted by a vertical handle *d*, is fixed, and, second, a knife *e*, formed of a flexible blade running the entire length of the sheath, first in a straight line and then in a curve, and emerging from this sheath at the point where the gouge commences in a direction which may be modified without changing anything in the principle of the invention.

In use the operator has constantly the handle *d* in the right hand. By pressing the concave side of the gouge along the stalk of the asparagus to be cut from the top downward the instrument is forced to penetrate into the soil, following the plant until it finds a slight resistance, indicating that beneath the gouge the commencement of the root has been encountered, or, better still, that it has reached the tuber itself. This point of penetration into the ground having been obtained, it is only necessary to cut off the asparagus by a downward pressure on the pivoted lever *f*, terminated by a handle *g*, which the operator operates by the left hand. (See the dotted line, Fig. 2.) A rod *h* connects the lever *f* and the knife *e*, being attached to the lever by a hinge and to the knife by means of screw nuts or clamps *i*. After the knife has severed the asparagus, as in Fig. 2, the implement as a whole may then be lifted in order to loosen the cut stalk and render it easier to be removed from the soil. Then the knife is returned to its sheath by means of the handle *d*, and, finally, the instrument is withdrawn from the soil and is then ready again to effect a similar operation.

Certain asparagus-cutters strip the root entirely before separating it from the stock, an operation which they execute more or less easily by different means, but the simplest and most rapid is indisputably by the use of my improved tool, the sheath free from the gouge enabling the knife to act directly beneath the stock without damaging it.

Except as regards the sheath and the knife, all the other parts of which mention has been made need only be considered as a simple indication of one way of carrying out the invention. These parts may be dispensed with, replaced, or modified as may be necessary and as experience may show to be desirable. For the same reason I do not prescribe any definite sizes nor the nature of the materials of which these parts as well as the sheath and the knife are to be constructed, and as regards these two latter the forms and details are also capable of any modifications as found desirable.

Having now particularly described and ascertained the nature of my said invention and in what manner the same is to be performed, I declare that what I claim is—

1. A knife for cutting asparagus and the like, comprising a sheath or guide adapted to be passed down along the stalk, a laterally-movable blade or cutter movable outwardly through the lower end of the sheath or guide to sever the stalk, and means for operating the said blade or cutter; substantially as described.

2. A knife for cutting asparagus and the like, comprising a sheath or guide adapted to be passed down along the stalk, and terminating in a gouge, a blade movable laterally out of said guide or sheath at its junction with the gouge, and means for operating the blade; substantially as described.

3. A knife for cutting asparagus and the like, comprising a tubular sheath or guide having a lateral opening in its lower portion, a flexible blade mounted in the sheath or guide, and means for operating the blade; substantially as described.

4. A knife for cutting asparagus and the like, comprising a tubular sheath or guide having a lateral opening in its lower portion and terminating in a gouge, a flexible blade mounted in the sheath or guide, and means for operating the blade; substantially as described.

5. A knife for cutting asparagus and the like, comprising a tubular sheath or guide having a lateral opening in its lower portion, a flexible blade within the sheath, a frame or standard from the lower end of which said guide depends, a handle for said frame, a lever pivoted to the frame or standard, a pivoted rod or link $h$, depending from said lever, and provided at its lower end with a clamp in which the upper end of the flexible blade is secured; substantially as described.

In testimony that I claim the foregoing I have hereunto set my hand this 2d day of September, 1901.

ALEXANDRE PERDRIEL.

Witnesses:
C. HUBERT,
CHARLES JARNEDIER.